United States Patent [19]

Meyer et al.

[11] Patent Number: 4,535,214
[45] Date of Patent: Aug. 13, 1985

[54] METHOD AND APPARATUS FOR JOINING A TUBE TO A TUBESHEET

[75] Inventors: John J. Meyer, St. Louis County, Mo.; Stanley D. Barth, Alton, Ill.

[73] Assignee: Nooter Corporation, St. Louis, Mo.

[21] Appl. No.: 526,679

[22] Filed: Aug. 26, 1983

[51] Int. Cl.³ .............................................. B23K 9/02
[52] U.S. Cl. ................................ 219/60.2; 219/60 A; 219/61; 228/183
[58] Field of Search .................... 219/60.2, 61, 137 R, 219/60 A; 228/183

[56] References Cited

U.S. PATENT DOCUMENTS

| 3,473,215 | 10/1969 | Stevens | 228/165 |
| 3,749,161 | 7/1973 | Hibbeler | 165/178 |
| 3,754,115 | 8/1973 | Roberts et al. | 219/137 R |
| 4,066,861 | 1/1978 | Broodman | 219/61 |
| 4,117,297 | 9/1978 | Sholle | 219/98 |
| 4,221,263 | 9/1980 | Meyer | 219/60.2 |

Primary Examiner—Roy N. Envall, Jr.
Assistant Examiner—Alfred S. Keve

Attorney, Agent, or Firm—Gravely, Lieder & Woodruff

[57] ABSTRACT

In order to join a tube to a tubesheet of a heat exchanger, the end of the tube is inserted into a socket at the end of a hole that passes through the tubesheet. The socket is large enough to receive the tube, but the hole is not, so the tube bottoms out in the socket and is thus located both radially and axially by the socket. A ring mold is fitted around the tube and moved against the tubesheet, so that its end fits into an annular groove that surrounds the socket in the back face of the tubesheet. The ring mold has a chamfered confining surface that surrounds the tube where the tube emerges from the socket. Once the ring mold is in place the portion of tube that is within the socket is welded autogenously to the tubesheet by rotating an electrode within the hole. The molten weld metal flows outwardly to the confining surface, but is prevented by that surface from flowing circumfentially, even when the welding is performed with the tube in a horizontal position. The molten metal resulting from the welding solidifies against, but does not bond to, the ring mold. The mold is thereafter removed.

17 Claims, 8 Drawing Figures 4,535,214

METHOD AND APPARATUS FOR JOINING A TUBE TO A TUBESHEET

BACKGROUND OF THE INVENTION

This invention relates in general to welding and more particularly to welding tubes to tubesheets.

In the typical tube-type heat exchanger, the tubes extend between tubesheets to which they are welded. Thus, one fluid may pass through the tubes while another circulates around the exterior of the tubes in the region between the two tubesheets, and heat will transfer through the tube walls from the one fluid to the other. Some fluids, when in the vapor phase, have a tendency to enter crevices and leave deposits. Any tubesheet which is exposed to this type of fluid should be welded to its tubes where the tubes enter the tubesheet, that is at the back face of the tubesheet. This eliminates crevices. In this connection tubes which have been welded to the front faces of their tubesheets have, on occasion, collapsed due to the build up of deposits in the crevices between the walls of the tubesheet holes and the tubes.

Heretofore, the traditional approach for welding a tube to the back face of a tubesheet has been to align the tube with its hole in the tubesheet, preferably by inserting the end of the tube a short distance within the hole, and then by means of an electrode inserted through the hole melting the tube and the surrounding portion of the tubesheet, so that the two join together at a weld along the back face of the tubesheet. In order for the weld to achieve full penetration the power must be quite high, but this makes the weld difficult to control. Sometimes a burn-through occurs, but more often the weld metal tends to flow in an undesirable manner. For example, when the weld is made with the tube extended horizontally, the molten metal will tend to flow toward the bottom of the tube so that the finished weld is thickest at its bottom. For this reason, many welders weld with reduced power, which often does not provide adequate penetration, or else they fabricate only with the tubes oriented vertically so that all welding is done in a downhand position. The latter is not practical where the overhead clearance is low.

Aside from the difficulties of controlling the weld, an inert gas must circulate both within the tube and around the exterior of the tube at the back face of the tubesheet. The former presents no difficulty, for the tube itself confines the gas and prevents it from dissipating. This does not hold true at the back face. Also, the inert gas adds an additional expense to the welding procedure.

SUMMARY OF THE INVENTION

One of the principal objects of the present invention is to provide a process for welding tubes to the back faces of tubesheets with sufficient power to achieve full penetration, yet without losing control over the weld. Another object is to provide a process of the type stated in which welds may be made with the tube in either vertical or horizontal positions, or for that matter inclined positions. A further object is to provide a process of the type stated which greatly reduces the tendency of welds to burn through at high power levels. An additional object is to provide a process of the type stated which does not require an inert gas at the back face of the tubesheet. Still another object is to provide a process of the type stated which is simple and inexpensive to perform and does not require complex equipment. These and other objects and advantages will become apparent hereinafter.

DESCRIPTION OF THE DRAWINGS

In the accompanying drawings which form part of the specification and wherein like numerals and letters refer to like parts wherever they occur.

DETAILED DESCRIPTION

Figure 1:
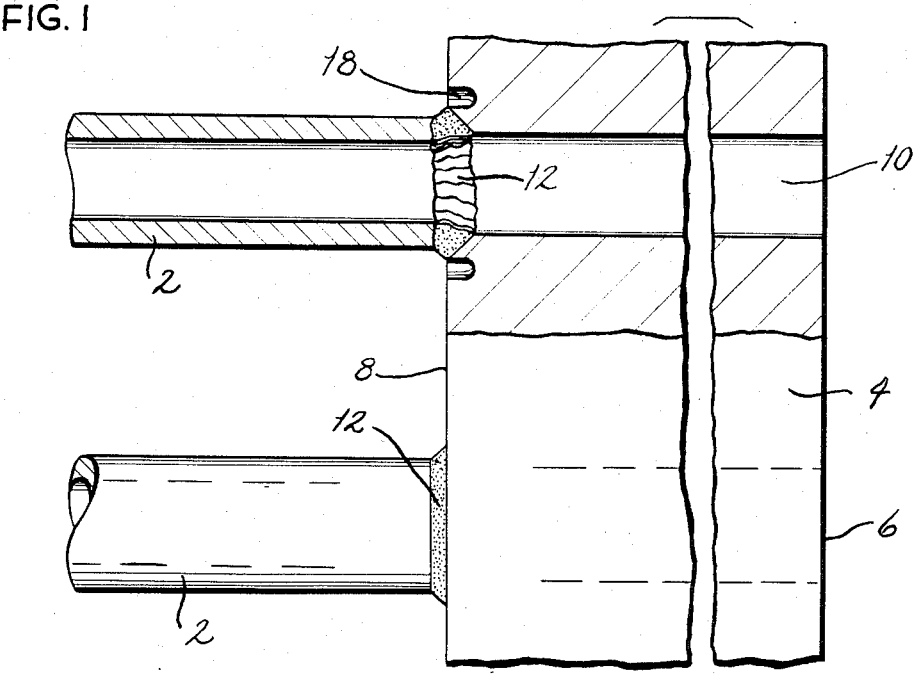
FIG. 1 is a fragmentary side elevational view, partially broken away and in section, of a heat exchanger having its tubes welded to one of its tubesheets in accordance with the process of the present invention.

Referring now to the drawings, the welding process of the present invention is employed to secure a tube 2 (FIG. 1) to a tubesheet 4 during the fabrication of a heat exchanger. The tubesheet 4 has a front face 6 and a back face 8, the former being presented toward the fluid that circulates through the tubes 2, while the latter is presented toward the fluid that circulates around the exterior surfaces of the tubes 2. To this end the tubesheet 4 is provided with holes 10 that extend completely through it from its front face 6 to its back face 8, there being a separate hole 10 aligned with and opening into the hollow interior of each tube 2. The tubes 2 and the tubesheet 4 are formed from compatible metals in the sense that the tubes 2 and the tubesheet 4 may be welded together autogenously. Indeed, each tube 2 is joined to the tubesheet 4 at a weld 12 which at the back face 8 of the tubesheet 4 surrounds the tube 2 and the tubesheet hole 10 with which it aligns. Since the weld 12 for each tube 2 is at the back face 8, no crevice exists where the tube 2 emerges from the tubesheet 4, and as a consequence, the back face 8 of the tubesheet 4 may be exposed to vapors without danger of the vapors leaving deposits that might otherwise girdle the tube 2.

The welds 12 have beveled exterior surfaces and likewise beveled interior surfaces (FIG. 1). The former eliminate crevices and reduce stress concentrations in the welds 12. The latter provide smooth transitions between the interiors of tubes 2 and the holes 10 with which they align, so that fluid will flow through those transitions without generating excessive turbulence. Obviously, the welds 12 are formed at optimum power settings, that is with sufficient electrical power to achieve full penetration. Moreover, the welds 12 may be formed with the tubes 2 in just about any orientation, including a horizontal position, which is most convenient for the fabrication of heat exchangers having long tubes.

Figure 2:
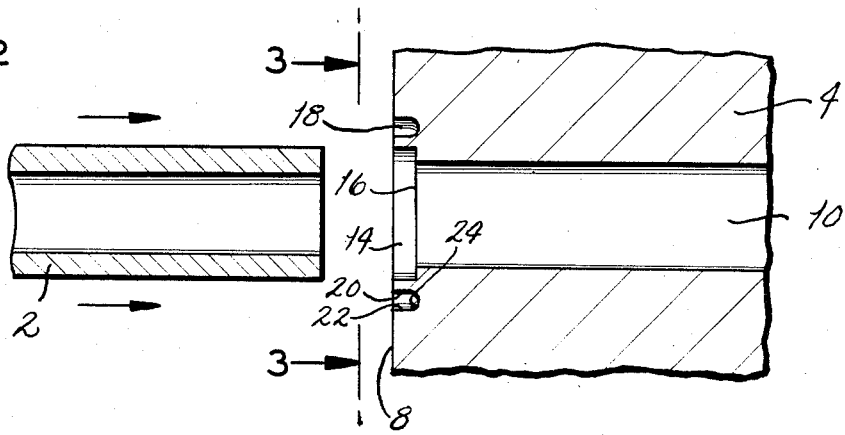
FIG. 2 is a sectional view of the tube and tubesheet prior to welding, with the tube being separated from the tubesheet.
Figure 4:
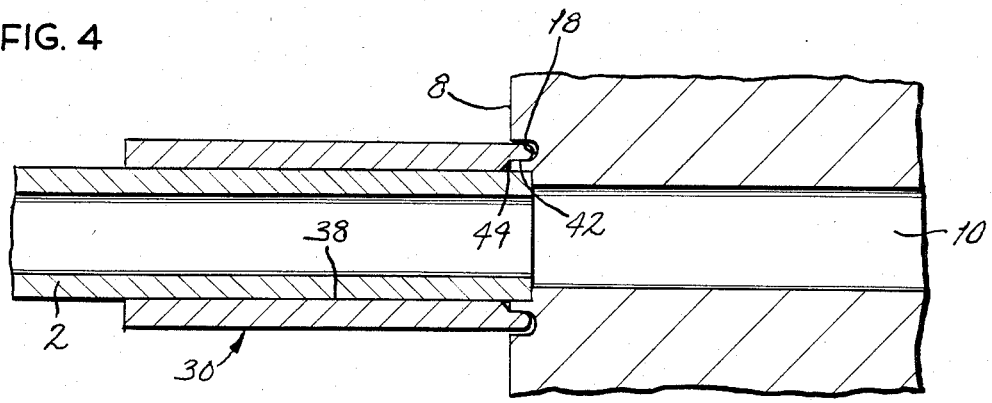
FIG. 4 is a sectional view showing the tube fitted into the socket at the end of the hole in the tubesheet and further showing a ring mold fitted around the tube and received at its end in the annular groove of the tubesheet.

The diameter of the holes 10 is for the most part less than the outside diameter of the tubes 2, but greater than the inside diameters of the tubes 2. However, each hole 10, at its end, is counterbored to provide a short socket 14 which opens out of the back face 8 (FIG. 2). The diameter of socket 14 is slightly greater than the outside diameter of the tube 2, so that the end of the tube 2 will fit easily within the socket 14. The very end of each tube 2 is squared off, and when inserted into its socket 14, it seats against a shoulder 16 that is likewise squared off with respect to the axis of the socket 14 and its hole 10 (FIG. 4). Thus, the socket 14 serves to locate the tube 2 both axially and radially at the end of the hole 10, at least prior to welding, so that the weld 12 is made with the tube 2 in the proper position. The relationship between the diameter of the hole 10, the inside and outside diameters of the tube 2, and the diameter and depth of the socket 14 into which the tube 2 fits are all set forth in U.S. Pat. No. 4,221,263.

Figure 3:
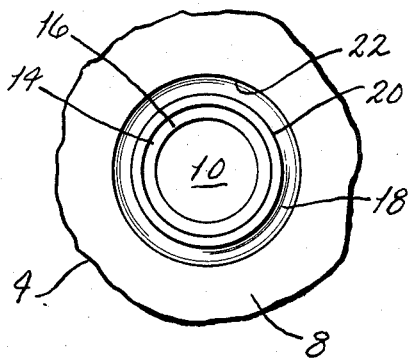
FIG. 3 is an end view of the tubesheet taken along line 3—3 of FIG. 2 and showing a socket and annular groove at the end of a hole through the tubesheet.

Aside from the foregoing, the tubesheet 4 is further provided with a trepan or annular groove 18 (FIGS. 2 & 3) around each socket 14, and like the socket 14 it surrounds, the groove 18 opens out of the back face 8 of the tubesheet 4 and is concentric with the hole 10. The annular groove 18 has a straight inside wall 20, a straight outside wall 22 and a curved bottom wall 24. The diameter of the inside wall 20 is preferably between 110 and 150 percent of the diameter of the socket 14, which is essentially the outside diameter of the tube 2. The width of the groove 18, that is the distance between its inside and outside walls 20 and 22, is preferably between 100 and 120 percent of the wall thickness for the tube 2. The depth of the groove 18 is preferably between 100 and 200 percent of the depth of the socket 14.

The annular grooves 18 serve to concentrate heat in the metal immediately surrounding the ends of the tubes 12 and are thus useful both during and after formation of the welds 12. More specifically, during the formation of the weld 12, they prevent heat from dissipating rapidly into the mass of the tubesheet 4, and as a result, the metal in the region between the socket 14 and the groove 18 readily melts, so that the ensuing weld 12 has good penetration into the tubesheet 4. If the end of the tube is thereafter heated by induction heating techniques, the heat applied to the tube 2 soaks into the weld, but owing to the annular groove 18 does not dissipate quickly beyond it, and as a result, less energy is required for annealing the weld 12.

Figure 5:
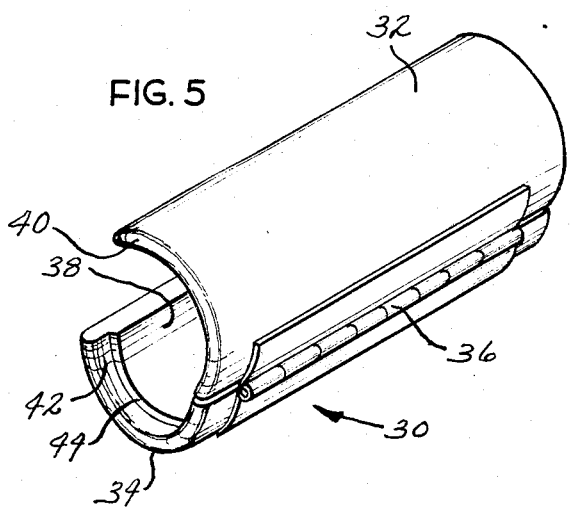
FIG. 5 is a perspective view of the ring mold in a partially opened condition.

Aside from concentrating heat the annular groove 18 surrounding each hole 10 receives the end of a ring mold 30 (FIGS. 4-6) that fits around the tube 2 for that hole and enables the ring mold 30 to more effectively confine molten metal while the weld 12 is made. The ring mold 30 is preferably segmented into semicircular halves 32 and 34 (FIG. 5) which are joined together at a hinge joint 36, so that the mold 30 can fold between open and closed conditions. When closed, the mold 30 has an inside surface 38 that is small enough to fit completely around a tube 2 quite snugly and thereby radially locate the mold 30 so that it can confine metal as the weld 12 for securing that tube 2 is made. When the mold 30 is open, the halves 32 and 34 spread far enough to enable the mold 30 to be placed around or withdrawn from a tube 2. Thus, the radius of the inside surface 38 for each mold half 32 and 34 is only slightly greater than the radius of the outside surface for the tube 2. Being semicircular, the two mold halves 32 and 34 come together not only at their hinge joints 36, but also along their opposite sides, so that the ring mold 30 will completely encircle the end of a tube 2. Each mold half is made from a substance that is preferably incompatible with the substance from which the tube 2 and tubesheet 4 are made in the sense that the two substances cannot be joined by welding. Copper is a suitable substance for the mold halves 32 and 34 when the tubes 2 and the tubesheet 4 are formed from steel. The mold 30 is about 4 to 6 inches long, and its halves 32 and 34 have a wall thickness ranging between 0.90 and 0.50 inches.

The mold halves 32 and 34 at one end of the ring mold 30 form a nose 40 (FIGS. 4-6) that is configured to fit into the annular groove 18 and against the inside wall 20 of the annular groove 18 when the mold 30 is closed. To this end, each mold half 32 and 34 has a short cylindrical surface 42 that is only slightly larger in diameter than the inside wall 20 of the annular groove 18 and as such is offset outwardly from the inside surface 38. The cylindrical surface 42 fits around the inside wall of the groove 18, while the inside surface 38 fits around the tube 2. Between its inside surface 38 and its cylindrical surface 42 each mold half 32 and 34 has a chamfered surface 44 that is oriented at between 30° and 60° with respect to the axes of the tube 2 and hole 10, and preferably at 45°. The end of each mold half 32 and 34 is curved, its radius of curvature being slightly less than that for the bottom 24 of the annular groove 18. The outside diameter of the mold halves 32 and 34, at least at the nose 40, is small enough so that it will not interfere with the outside wall 22 of the groove 18 and this of course enables the nose to fit into the groove 18. When the nose 40 of the ring mold 30 fits into the annular groove 18 to its fullest extent, the mold 30 in the region opposite its chamfered surface 44 forms a mold cavity that surrounds the tube 2 where the tube 2 emerges from the socket 14.

To weld a tube 2 to the tubesheet 4, one end of the tube 2 is inserted into the socket 14 at the end of one of the holes 10 in the tubesheet 4 (FIG. 2). Indeed, the tube 14 is advanced until it bottoms out against the shoulder 16 at the bottom of the socket 14 (FIG. 4). The opposite end of the tube 2 is supported in any suitable manner to maintain the axes of the tube 2 and hole 10 aligned, in which case the tube 2 is perpendicular to the back face 8 of the tubesheet 4.

Once the tube 2 is fitted into the socket 14 for a tubesheet hole 10, a welding head 50 (FIG. 6) is inserted into the hole 10 from the opposite end of that hole 10, that is from the end at the front face 6. The welding head 50 includes a spindle 52 which is capable of revolving within the hole 10, and the spindle 52 in turn at its far end carries an electrode 54 which is directed radially outwardly away from the surface of the spindle 52. The electrode 54 terminates close to the inside surface of the tube 2, but does not contact that surface. The head 50 also includes a sleeve 56 that fits into the hole 10 with little clearance and positions the spindle 52 so that it is centered on the axis of the hole 10. The head 50 further contains a tube 58 that surrounds the spindle 52, yet terminates short of the electrode 54, so as to serve as a conduit for delivering an inert gas to the region of the electrode 54. Finally, the head 50 has a stop 60 which may be adjusted in the axial direction to accommodate the head 50 to tubesheet holes of varying depth. The stop 60 should be adjusted so as to position the electrode 54 very close to the end of the tube 2, that is in the region of the shoulder 16 at the base of the socket 14.

Figure 6:
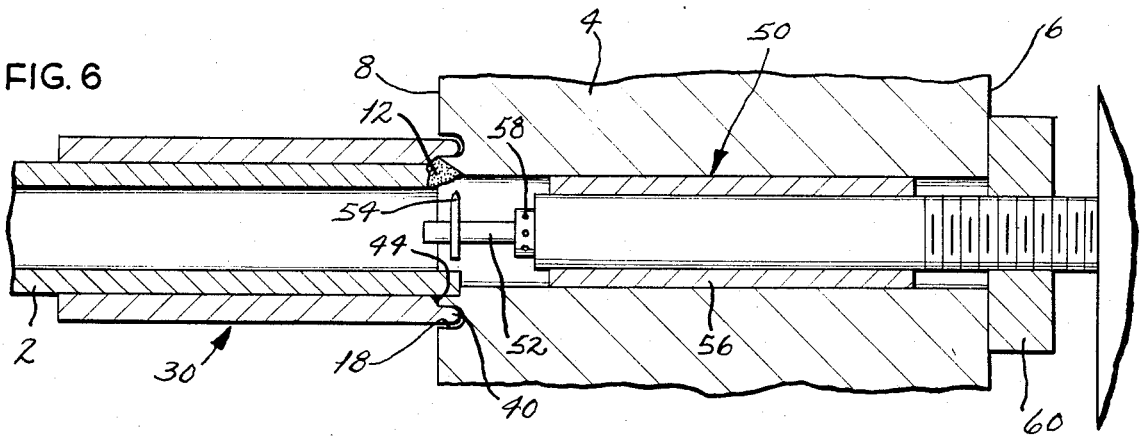
FIG. 6 is a sectional view similar to FIG. 4, but showing a welding head installed in the hole of the tubesheet and a weld partially completed by the head.

Also, the ring mold 30 is installed over the tube 2 at the end of the hole 10 (FIGS. 4 & 6). More specifically, the mold 30 is opened so that its halves 32 and 34 are spread far enough to accommodate the tube 2, whereupon the mold 30 is maneuvered over the tube 2 with its nose 40 presented toward the tubesheet 4. Once the mold halves 32 and 34 are generally around the tube 2, the mold 30 is closed so that the inside surfaces 38 of the mold halves 32 and 34 come against the outside surface of the tube 2. Next the closed mold 30 is moved axially over the tube 2 until its nose 40 enters the annular groove 18. Indeed, the mold 30 is advanced into the groove 18 as far as it will go, and this limit is normally reached when the outer edge of the chamfered surface 44 comes against the back face 8 of the tubesheet 4. The mold 30 creates an annular mold cavity of triangular cross-section at the chamfered surface 44, one wall of that cavity being formed by the surface 44 itself, another by the back face 8 of the tubesheet 4, and still another by the outside surface of the tube 2.

Once the mold 30 and the welding head 50 are in their proper positions, an inert gas is introduced into the tube 2 and the aligned hole 10, it being supplied through the tube 58 of the welding head 50. The inert gas displaces air from the end of the tube 2 and the adjacent end of the hole 10 so as to create an inert environment around the electrode 54. The electrode 54 is then energized by impressing an electric potential across it and the tube 2 and tubesheet 4. At the same time, the spindle 52 is turned at a uniform angular velocity so that the tip of the electrode 54 orbits within the hole 10. The electrical potential is great enough to strike an arc between the electrode 54 and the end of the tube 2, and as a consequence the metal at the end of the tube 2 melts (FIG. 6). Enough electrical current passes through the arc to melt not only the end of the tube 2 but the surrounding portion of the tubesheet 4 which is generally the region circumscribed by the annular groove 18. Indeed, the groove 18 prevents the heat generated by the arc and electrical current from quickly dissipating into the mass of the tubesheet 4, so that the heat is concentrated in the region circumscribed by the groove 18. The molten metal flows outwardly into the mold cavity and comes against the chamfered surface 44 of the ring mold 30 where, owing to the lower temperature of the ring mold 30, the molten metal solidifies and forms a fillet between the back face 8 of the tubesheet 4 and the outer surface of the tube 2. The weld 12 may be formed autogenously, that is without the addition of weld wire filler metal, and as a consequence the pool of molten metal that develops opposite the end of the orbiting electrode 54 is displaced outwardly somewhat to fill the mold cavity. This obliterates the end of the tube 2 such that a curved transistion is formed between the inside surface of the tube 2 and the somewhat larger inside surface of the hole 10. As the tip of the electrode 54 orbits within the hole 10, the inert gas within the hole 10 keeps air away from the molten metal of the weld 12, at least insofar as the interior of the tube 2 is concerned. At the exterior of the tube 2, the ring mold 30 keeps air away from the molten metal of the weld 12. Thus the weld 12 is not contaminated by oxides. The spindle 52 makes one complete revolution and indeed slightly more before it is de-energized, so that the weld 12 which is formed is along the entire end of the tube 2, that is for a full 360°.

While the pool of molten metal is displaced outwardly into the cavity formed opposite the chamfered surface 44 of the mold 30, the molten metal does not tend to flow downwardly for it is confined at its outer surface by the surface 44. Thus, the weld 12 has generally uniform thickness even when the welding is performed with the tubes 2 in a horizontal position.

Even though the molten metal solidified against the chamfered surface 44 of the ring mold 30, it does not bond to the ring mold 30. In the first place, the ring mold 30 is a relatively large mass located somewhat remote from the electrode 54, and therefor does not reach its melting temperature. In other words, the ring mold 30 functions as a heat sink and soaks up much of the heat that would otherwise maintain the metal of the weld 12 molten. Secondly, it is formed from a dissimilar metal, one to which the metal of the tube 2 and tubesheet 4 cannot be easily joined by means of a weld.

After the weld 12 has cooled, the ring mold 30 is moved axially a short distance on the tube 2 to withdraw its nose 40 from the annular groove 18. Then it is opened and removed from the tube 2. It may thereafter be installed on another detached tube 2 to provide a mold cavity and heat sink at the end of that tube. The welding head 50 is likewise withdrawn from the hole 10 and installed in the hole 10 leading to the tube 2 around which the ring mold 30 is repositioned.

Figure 7:
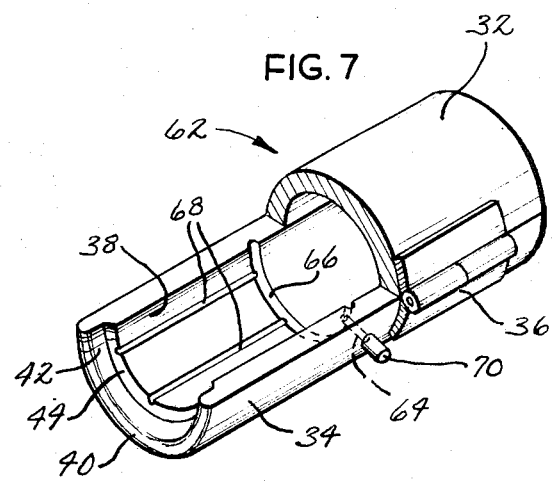
FIG. 7 is a perspective view of a modified ring mold, partially broken away and in section.

A modified ring mold 62 (FIG. 7) is very similar to the ring mold 30 in that it has mold halves 32 and 34, a hinge joint 36, an inside surface 38, a nose 40, a cylindrical surface 42, and a chamfered surface 44, all of which are substantially the same as their counterparts on the ring mold 30. In addition, the mold half 34 of the ring mold 62 is provided with a radially directed port 64 which is offset rearwardly from the nose 40, and the port at its inner end opens into an annular channel 66 that extends circumferentially in both of the mold halves 32 and 34. Extending between the annular channel 66 and the chamfered surface 44 at the nose 40 of the ring mold 62 are axial channels 68. Both the annular channel 66 and the axial channels 68 are along and indeed open out of the inside surface 38 of the ring mold 62, and they are thus presented toward the outside surface of the tube 2 around which the ring mold fits. The outer end of the port 64 has a fitting 70 threaded into it, and this fitting is connected through a flexible hose to a source of inert gas.

The modified ring mold 62 fits around the tube 2 much the same as the ring mold 30, but when used provides an extra measure of protection against oxide contamination of the weld 12. In particular, before the welding head 50 is energized, inert gas is introduced into the port 64 through the hose which is coupled with the port 64 at the fitting 70. The gas flows into the annular channel 66 and thence into the axial channels 68 which directs it into the cavity surrounded by the chamfered surface 44, that is the cavity into which the molten metal of the weld 12 flows. The inert gas floods the cavity and displaces all air from it. Thus, when the welding head 50 is energized the outside of the weld 12 is likewise engulfed in inert gas.

Figure 8:
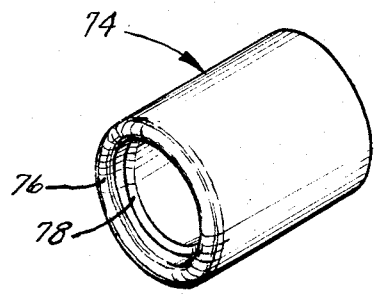
FIG. 8 is a perspective view of another modified ring mold.

A modified ring mold 74 (FIG. 8) is totally circular, that is a one-piece construction, and is formed from a frangible material such as a ceramic. It has a nose 76 which is configured to fit into the annular groove 18 surround a tube socket 14, and a chamfered surface 78 leading up to the inside surface of the nose 76. The modified ring mold 64 is fitted over the end of a tube 2 before the tube 2 is inserted into a socket 14 in the tubesheet 4. Indeed, all of the tubes 2 are fitted with modified ring molds 74 and then inserted into their respective sockets 14. Next the ring molds 74 are moved forwardly to bring their noses 76 into the annular grooves 18 in the tubesheet 4, whereupon the tubes 2 are welded to the tubesheet 4 as previously described. The chamfered surface 78 of each ring mold 64 confines the molten metal that results from the welding operation at the tube 2, and this enables the tube 2 to be welded in a horizontal position with enough power to achieve the desired penetration. After the welds 12 have been made, the modified ring molds 74 are removed merely by striking them with a sharp object so that they crack and fall away from the tubes 2.

While the annular grooves 18 concentrate the heat generated during welding and further provide convenient receptacles for the ring molds 30, 72 or 64, with slight modification, the ring molds 30, 72 and 64 may be used with tubesheets having totally flat back faces. In that case, the end face of the ring mold should be flat so that it will abut against the flat back face of the tubesheet. The chamfered surfaces 44 or 68 will lead away from the flat end face.

This invention is intended to cover all changes and modifications of the example of the invention herein chosen for purposes of the disclosure which do not constitute departures from the spirit and scope of the invention.

What is claimed is:

1. A process for joining a metal tube to a metal tubesheet having front and back faces, a hole extending through it, and an annular groove opening out of its back face and extending around the hole, said process comprising: positioning the tube in alignment with the hole in the tubesheet when the end of the tube is at the back face of the tubesheet; placing a ring mold around the tube and inserting the end of the ring mold into the annular groove that opens out of the back face of the tube sheet; and autogenously welding the tube to the tubesheet at the back face of the tubesheet, but not to the ring mold, by applying heat to the end of the tube and the adjacent portion of the tubesheet from within the hole in the tubesheet.

2. The process according to claim 1 and further comprising removing the ring mold from the tube.

3. The process according to claim 2 wherein the ring mold is split into segments that may be spread apart, and the step of placing a ring mold around the tube includes fitting the segments around the tube while they are spread apart and then closing the segments so that when closed they substantially encircle the tube, and the step of removing the ring mold includes spreading the segments apart and withdrawing the ring mold laterally from the tube.

4. The process according to claim 2 wherein the ring mold is made from a frangible material, and the step of removing the ring mold includes breaking the ring mold.

5. The process according to claim 1 wherein the ring mold is formed from a material that is incompatible with the metals of the tubesheet and the tube in the sense that is does not easily weld to those metals.

6. The process according to claim 1 wherein the step of welding the tube to the tubesheet comprises rotating an electrode within the hole such that the tip of the electrode orbits close to the end of the tube and maintaining an arc between the end of the tube and the tip of the electrode.

7. The process according to claim 1 wherein the ring mold before the weld is made has a confining surface that is located outwardly from the tube; and wherein the step of welding melts enough of the metal of the tube and tubesheet to cause molten metal to flow outwardly and solidify against the confining surface of the ring mold.

8. The process according to claim 7 and further comprising introducing an inert gas into the tube and also into the region surrounded by the confining surface as the tube is welded to the tubesheet.

9. The process according to claim 1 wherein the tubesheet also has a socket that opens out of its back face and aligns with the hole; and wherein the end of the tube is small enough to fit into the socket but too large to fit into the portion of the hole beyond the socket; and wherein the step of positioning the tube in alignment with the hole includes inserting the end of the tube into the socket.

10. The process according to claim 9 wherein the ring mold before the weld is made has a confining surface that is located outwardly from the tube; and wherein the step of welding melts enough of the metal of the tube and tubesheet to cause molten metal to flow outwardly and solidify against the confining surface of the ring mold.

11. A process for joining a tube to a tubesheet having a back face and a front face and a hole extended between the two faces, the tube and the tubesheet being formed from compatible metals so that they can be welded together autogenously, said process comprising: inserting the end of the tube into that end of the hole which opens out of the back face of the tubesheet, so that the tube projects from the back face of the tubesheet; placing a mold around the tube and against the back face of the tubesheet, the mold having a confining surface which surrounds the region of the tubesheet where the tube emerges from the hole, the confining surface of the ring mold, when the ring mold is so placed, being spaced outwardly from the exterior of the tube and further being beveled with respect to the axis of the tube; and from within the hole applying sufficient heat to the end of the tube and the adjacent region of the tubesheet to weld the tube to the tubesheet with the molten metal resulting from the heating coming against and solidifying against the confining surface of the ring mold without bonding to the ring mold.

12. The process according to claim 11 wherein the hole at the end thereof which opens out of the tubesheet is enlarged to provide a socket which accommodates the end of the tube, but the remainder of the hole is narrower than the tube so that the tube fits only into the socket.

13. The process according to claim 12 wherein the tube and the hole of the tubesheet are circular in cross section, and the inside diameter of the tube is less than the diameter of that portion of the hole that is located beyond the socket.

14. A process for joining a tube to a tubesheet having a back face and a front face, a hole extended between the two faces, and an annular groove which surrounds the hole at the back face, the tube and the tubesheet being formed from compatible metals so that they can be welded together autogenously, said process comprising: inserting the end of the tube into that end of the hole which opens out of the back face of the tubesheet, so that the tube projects from the back face of the tubesheet; placing a mold around the tube and against the back face of the tubesheet such that the end of the mold fits into the annular groove, the mold having a confining surface which surrounds the region of the tubesheet where the tube emerges from the hole; and from within the hole applying sufficient heat to the end of the tube and the adjacent region of the tubesheet to weld the tube to the tubesheet with the molten metal resulting from the heating coming against and solidifying against the confining surface of the ring mold without bonding to the ring mold.

15. In combination with a tubesheet having a hole extended through it, a counterbore at the end of the hole and opening out of one face of the tubesheet, and an annular groove surrounding the counterbore and opening out of the same face, and with a tube that fits into the counterbore of the tubesheet to be welded to the tubesheet at the counterbore, a ring mold to facilitate welding of the tube to the tubesheet, the ring mold being sized to fit snugly around the tube and having a nose which aligns with and is adapted to fit into the annular groove in the tubesheet when the mold is around the tube, the ring mold having a chamfered surface located opposite to the region of the tube that enters the counterbore in the tubesheet, whereby the molten metal that develops as the tube is welded to the tubesheet flows out to and against the chamfered surface.

16. The combination according to claim 15 wherein the ring mold has segments which may be separated to facilitate installation of the ring mold around the tube.

17. The combination according to claim 16 wherein the ring mold contains channels that lead up to the chamfered surface to enable an inert gas to be introduced into the region surrounded by the chamfered surface before the weld is made.

* * * * *